(12) United States Patent
Rudershausen

(10) Patent No.: US 8,423,598 B2
(45) Date of Patent: Apr. 16, 2013

(54) CIRCUIT ARRANGEMENT AND METHOD FOR RECEIVING SPECIALLY DESIGNED CODED SIGNALS

(76) Inventor: Reinhart Rudershausen, Schondorf am Ammersee (DE)

( * ) Notice: Subject to any disclaimer, the term of this patent is extended or adjusted under 35 U.S.C. 154(b) by 1293 days.

(21) Appl. No.: 11/572,615

(22) PCT Filed: Mar. 2, 2006

(86) PCT No.: PCT/EP2006/001902
§ 371 (c)(1),
(2), (4) Date: Sep. 7, 2007

(87) PCT Pub. No.: WO2006/099934
PCT Pub. Date: Sep. 28, 2006

(65) Prior Publication Data
US 2008/0147766 A1    Jun. 19, 2008

(30) Foreign Application Priority Data
Mar. 23, 2005 (EP) ..................... 05102364

(51) Int. Cl.
*G06F 17/15* (2006.01)
*G01S 13/00* (2006.01)

(52) U.S. Cl.
USPC .................. 708/426; 708/425; 342/189

(58) Field of Classification Search .......... 708/422–426; 375/142–143, 150–153, 340, 343
See application file for complete search history.

(56) References Cited

U.S. PATENT DOCUMENTS 5,148,174 A * 9/1992 Harmuth ................ 342/21
5,203,823 A * 4/1993 Wadaka et al. ............ 73/602
6,567,482 B1 * 5/2003 Popovic ................ 375/343

OTHER PUBLICATIONS

F.J. Mendieta, A. Trevino and C.A. Martinez, "Complementary sequence correlations with applications to reflectometry studies", Instrumentation and Development, vol. 3, No. 6, 1996, pp. 37-46.*
Marcel J. E. Golay; "Complimentary Series"; IRE Transactions on Information Theory ; pp. 82-87; Apr. 1961.
D. T. Farley; "Online data processing techniques for MST radars"; Radio Science, American Geophysical Union; vol. 20, No. 6; pp. 1177-1184; Nov. 1995.
Malek G. M. Hussain; "Principles of High-Resolution Radar Based on Nonsinusoidal Waves—Part I: Signal Representation and Pulse Compression"; IEEE Transactions on Electromagnetic Compatibility; vol. 31, No. 4; pp. 359-368; Nov. 1989.
Scott Foster; "Impulse Response Measurement Using Golay Codes"; International Conference on Acoustics, Speech & Signal Processing. ICASSP. Tokyo; vol. 4, Conf. 11; pp. 929-932; Apr. 1986.
English translation of PCT International Search Report and Written Opinion of the European Patent Office for PCT/EP2006/001902; 10 pages; Jul. 6, 2006.

* cited by examiner

*Primary Examiner* — Chuong D Ngo
*Assistant Examiner* — Matthew Sandifer
(74) *Attorney, Agent, or Firm* — Fish & Richardson P.C.

(57) ABSTRACT

In order to attain an optimally compressed, narrow pulse peak at the filter output of a correlation filter for the purpose of reception, the interfering secondary maxima of the autocorrelation function of binary codes must be as small as possible. The invention uses specially designed signal codes which are used to generate the associated complementary signal code from the received sequence by means of evaluation in the reception filter. The subsequent parallel formation of the autocorrelation functions of the received signal code and the complementary signal code exhibits secondary maxima having an opposite mathematical sign, thus resulting in the desired prefect pulse peak having secondary maxima which are equal to zero during summation at the filter output.

17 Claims, 3 Drawing Sheets

```
 1                          1  1  1 -1 -1 -1  1 -1
 1                       1  1  1 -1 -1 -1  1 -1
 1                    1  1  1 -1 -1 -1  1 -1
-1                -1 -1 -1  1  1  1 -1  1
-1             -1 -1 -1  1  1  1 -1  1
-1          -1 -1 -1  1  1  1 -1  1
 1        1  1  1 -1 -1 -1  1 -1
-1    -1 -1 -1  1  1  1 -1  1
```

| Σ | -1 | 0 | -1 | 0 | -3 | 0 | 1 | 8 | 1 | 0 | -3 | 0 | -1 | 0 | -1 |

| Σ | 1 | 0 | 1 | 0 | 3 | 0 | -1 | 8 | -1 | 0 | 3 | 0 | 1 | 0 | 1 |

FIG. 4

CIRCUIT ARRANGEMENT AND METHOD FOR RECEIVING SPECIALLY DESIGNED CODED SIGNALS

FIELD OF THE INVENTION

The invention is directed to a circuit arrangement and a method for receiving specially designed binary coded signals by means of a digital filter forming the autocorrelation function of transmitted and received binary signals with a downstream coded digital filter, which leads to a compression of the pulse signal form to a narrow pulse peak and thus improves detection out of the noise or detection with respect to noise signals, respectively, and allows for less cross-talk.

STATE OF THE ART

Correlation filters using a special signal form for theoretically optimal detection out of the noise and for improving resolution and accuracy and/or for synchronization purposes have been known in signal processing and data transmission for a long time. Continuous modulations (linear, quadratic, logarithmic frequency modulations) as well as discrete modulations (PSK, phase shift keying binary and multiphase) have been chosen as signal forms, see, for example, W. S. Burdic, Radar Signal Analysis, Prentice Hall, 1968, page 193 et sqq.

It is common to all methods that in the correlation filter, the autocorrelation function (AKF) is formed between the pulse response of the filter—which corresponds to the transmitted signal (except for the mathematical sign)—and the received signal, when receiving the signals (consideration without noise or other transmission errors).

It is also known that, when using binary coded signals, the correlation filters become very simple. The binary Barker codes (W. S. Burdic, Radar Signal Analysis, Prentice Hall, 1968, page 189) obtain an ideal compression ratio of main maximum N (=number of sub-pulses or code bits) with respect to secondary maxima at the filter output, that means N:1, are known up to N=13. It has been proven for binary codes that no codes exist for numbers of sub-pulses N greater than 13, which reach the ideal AKF of N:1 as signal form, see I. M. Ivanova, Yu. L. Ketkov, and T. S. Yampol'skaya, On the existence of Barkercodes, Izvestiya Vyssheishkoly, Radiofizika 3 (1960), pages 391-396 and R. Turyn and J. E. Storer: On binary Sequences. Proc. Am. Math. Soc. (1961), pages 394-399. That means that binary codes of desired larger bit numbers N between 100 and 1000 exhibit always interfering secondary maxima in the AKF, which leads to misdetection or mismeasurement. So far, it has been tried to suppress the interfering secondary maxima by code evaluation differing in amplitude in the correlation filter, wherein the evaluation differs from the binary values +1 and −1 and has to be calculated and set very perfectly for each AKF. See, for example: A new algorithm to optimize Barker code sidelobe suppression filters; Hua, Chen Xiao, Oksman, Juhani; IEEE Transactions on Aerospace and Electronic Systems (ISSN 0018-9251), vol. 26, July 1990, pages 673-677.

PN sequences, especially gold sequences, are used for synchronous data transmission, because the periodic AKF (PAKF) exhibits a main-to-secondary maxima ratio of N to −1. However, the aperiodic AKF as well as the KKF and PKKF (periodic cross-correlation function) show large secondary maxima of at least larger than the square root of 2N. This leads to disturbances and cross-talk and means a limitation of their application.

SUMMARY OF THE INVENTION

It is the object of the invention to enhance a binary code modulation scheme for a circuit arrangement of the type described.

It is a further object of the invention to enhance a circuit arrangement of the type described by using a new binary signal coding with associated digital reception filters such that the code length one wants to use is larger by the factor of 10 or 100 compared to Barker codes on the one hand, and that the secondary maxima in the AKF will vanish to zero at the same time in order to obtain optimal pulse compression on the other hand.

The object is achieved according to the invention by the circuit arrangement and the method according to the claims. Preferred embodiments are described in the dependent claims.

Signal codes according to the invention are used in the digital reception filter by using the respective associated complementary codes such that the secondary maxima are cancelled to zero. According to a code generation method, the bit length N can be doubled iteratively, respectively, wherein the feature that the secondary maxima are zero, is maintained.

Furthermore, the invention allows that only one sequence of a pair of sequences of complementary codes needs to be transmitted. According to the invention, means are provided so that the second sequence of the pair is first generated in the receiver. The summation of the autocorrelated received code and the autocorrelated complementary code, which is generated in the receiver, results in a main maximum of maximum height together with the cancellation of the secondary maxima. It is of special relevance here that just one sequence of the pair needs to be transmitted, whereas the other sequence of the pair is generated in the receiver.

According to a code generation method of the invention, the bit length N can be doubled iteratively, respectively, wherein the feature is maintained that the secondary maxima are zero: the following subsets of complementary sequences are appropriate for the novel perfect correlation-matched filter. However, their composition had already been given by Golay (1960) and Welti (1959) and was followed up and proposed for application by Farley (1985), Hussain (1988), Darnell (1988), Lüke (1992), without using, however, the decisive symmetry feature of these sequences in the filter circuit, as will be described below:

An example is the complementary pair of the two 4-chip Barker sequences:

| | | | | | | | |
|---|---|---|---|---|---|---|---|
| Sequence 1, A | +++− | (original sequence) | | | | | |
| Sequence 2, B | +−++ | (complementary sequence to sequence 1) | | | | | |
| AKF1 | −1 | 0 | +1 | +4 | +1 | 0 | −1 (from sequence 1) |
| AKF2 | +1 | 0 | −1 | +4 | −1 | 0 | +1 (from sequence 2) |
| | 0 | 0 | 0 | +8 | 0 | 0 | 0 (sum) |
| Sequence 3, C: | −+++ | (sequence 1 reverse) | | | | | |
| Sequence 4, D: | ++−+ | (sequence 2 reverse) | | | | | |

By putting respective complementary pairs in series, arbitrarily long complementary pairs for all lengths $2^n$ result. FIG. 3 shows an 8-chip complementary sequence as an example, which is composed of the 4-chip Barker sequences A and D' (D' denotes the inverse sequence of D). Each of the four mentioned Barker sequences or their inverse sequences can be chosen as a starting sequence for the reception filter with complementary pairs according to the invention.

In addition, the invention provides a method for forming a pulse-shaped signal in a reception filter. First, a signal code is received with a carrier frequency signal of a form +1, +1 or a code derived from that by the symmetry law $X_i = \pm X_{N-1-i}^* e^{j\pi i}$ or a code generated by time reversal or a code duplicated by weighting with alternating mathematical signs or a code generated by addition of a quadrature component or a code changed by arbitrary cyclic shifting or similar transformations, which fulfils the symmetry condition $X_i = \pm X_{N-1-i}^* e^{j\pi i}$, respectively. Then, a signal is branched off from the received signal. The branched-off signal is multiplied with alternating mathematical sign in order to build a complementary code. After that, the first autocorrelation of the received signal and a second autocorrelation of the branched-off received signal, which has been multiplied with alternating mathematical sign, are formed. Finally, the results of the first and second autocorrelations are added. This method can be expanded to further aspects, which are eminent from this disclosure.

Additionally, a transmission system is provided according to the invention, which uses the method according to the invention. Preferably, at least two codes are used for transmission, wherein no secondary maxima show up during the cross correlation of the two codes, especially, the cross correlation of the two codes used is zero. The transmission system can also be designed as a multi-subscriber system by using sequences of complex values.

The invention can, among others, be used for synchronization, system measurement technique as well as in the field of linear antennas with coded aperture and multi-antenna systems.

BRIEF DESCRIPTION OF THE DRAWINGS

Further aspects and advantages of the present invention will become apparent from the explanation of the drawings.

FIG. 2 shows a sum formation of an autocorrelation according to the present invention.

FIG. 3 shows the formation of a complementary code according to the present invention.

FIG. 4 shows a further sum formation of an autocorrelation according to the present invention.

DETAILED DESCRIPTION OF PREFERRED EMBODIMENTS

Figure 1:
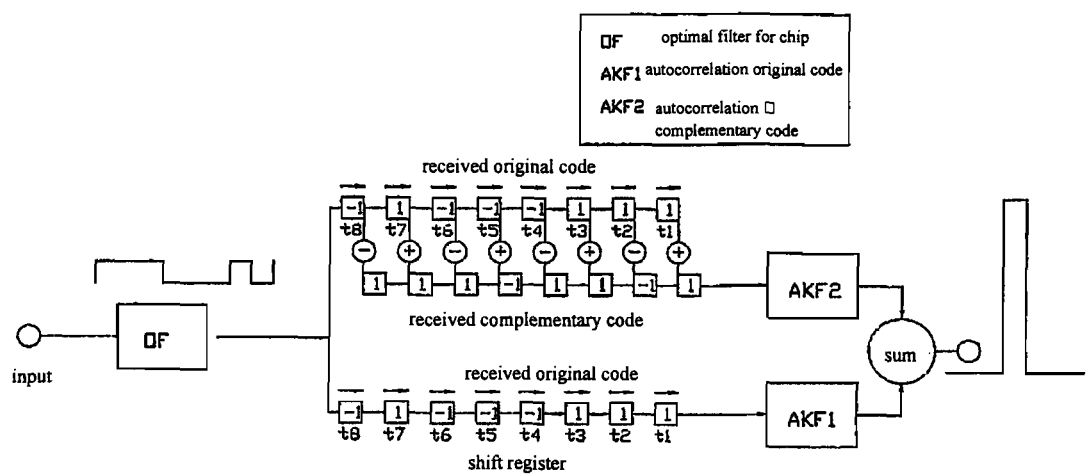
FIGS. 1 and 1a show circuit arrangements according to the present invention.
Figure 1A:
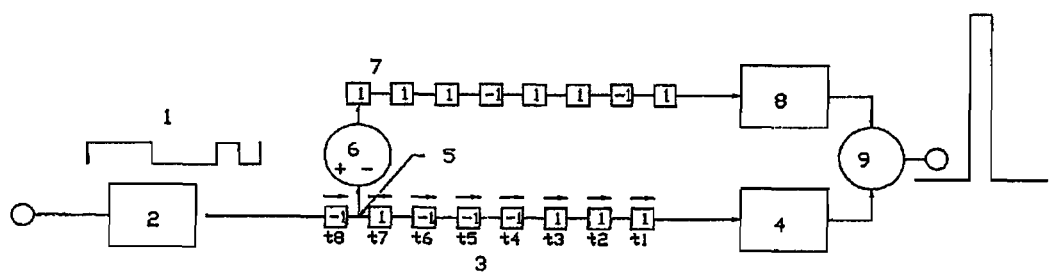

FIG. 1a shows one of the signal codes 1 according to the invention without a carrier frequency with two phase levels 0° and 180°, which includes eight sub-pulses at the reception filter input. The envelope of the received signal after the sub-pulse filter and the D/A converter 2 is stored as a positive or negative digital value, here denoted as +1 or −1, depending on the phasing of the transmitted signal code, in a shift register 3, which switches further in time each sub-pulse duration τ. Subsequently, the filter part 4 forms the autocorrelation sum $$AKF_k = \sum_{i=0}^{N-1-k} X_i \cdot X_{i+k}$$

e.g. according to the scheme for the 8-bit code in FIG. 2.

The mentioned signal codes have the following internal symmetry property, which is used in the reception filter for perfect pulse compression without secondary maxima: after the first sub-pulse duration τ, for example, a second signal is branched off at point 5 in FIG. 1a of the shift register 3 and is alternatively weighted in the filter part 6 with + and −. By the weighting 6 of the received signal code with the simple sequence of alternating phase jumps Bi=+, −, +, −, +, −, +, − (or digital values +1, −1 and so on or, for example, L, 0 and so on for QPSK), the associated complementary code $X_i$ is formed with the exact negative secondary maxima values compared to the original code, which was transmitted, see $X_i$ in FIG. 3, for the example of the above-chosen optimal 8-bit code. The weighting 6 in FIG. 1a of the received signal code with +, − sequence can also be done in a parallel circuit, as shown in FIG. 1.

The AKF formed by means of shift register 7 and filter part 8 for this complementary code generated by +1, −1 weighting has the advantageous result shown in FIG. 4 with the complementary secondary maxima with respect to the AKF of the original code of FIG. 2.

The filter part 9 shown in FIG. 1a in front of the output of the digital filter is a simple summation, namely:

Filter output=

AKF1=AKF(received code correlated with stored original code)

plus

AKF2=AKF(received code multiplied by +1,−1 series=complementary code correlated with stored complementary code).

Figure 5:
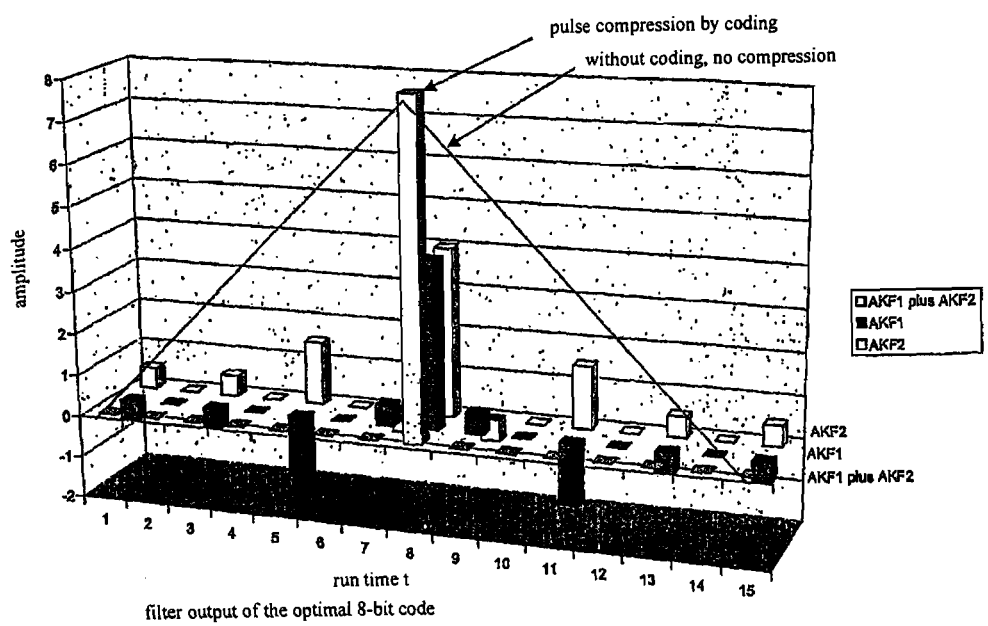
FIG. 5 shows addition of autocorrelation sums according to the present invention.

The result for the 8-bit code is shown in FIG. 5, and it results in the optimal pulse-shaped reception signal form without secondary maxima.

Both codes, namely the 8-bit code (code 1=A) and its complementary code (code 2=B) resulting from the (+1, −1) weighting described here as an example, can be used as optimal signal codes, respectively. Additionally, a third and a fourth optimal 8-bit code result by transmitting the code sequences of the first and second codes in time-reversed order. Accordingly, the third and fourth optimal 8-bit codes read:

−1, +1, −1, −1, −1, +1, +1, +1, (code 3=C)
+1, +1, +1, −1, +, +1, −1, +1, (code 4=D)

The optimal signal codes with respectively doubled lengths 16, 32, 64, 128, 256, 512, 1024 and so on of sub-pulses result by an iterative code generation method out of the code with the next lower sub-pulse count by using the symmetry law for the complementary code and by continuing therewith to the doubled length in the following manner:

$$X_i = \pm X_{N-1-i}^* e^{j\pi i} \; i=0, 1, \ldots N-1$$

With the above-mentioned algorithm, optimal reception filters can be built up to an arbitrary length $2^n$ out of the respective optimal code of the length $2^{n-1}$ starting with the length N=2 or 4. The effective bandwidth is enlarged by a factor of N for an optimal correlation code with N sub-pulses (Burdic, page 184). Thus, the resolution of pulse measurement can be improved by a factor N. The embodiment of the circuit arrangement can again be chosen as in the described example, only taking the corresponding higher bit number N.

A further difficulty when using previous binary signal codes is that the cross correlation generates interfering secondary maxima, when using two different signal codes. On the contrary, the two mentioned codes 1 and 4 (A, D) describe a set of codings, whose cross-correlation functions are exactly zero without secondary maxima. This offers the possibility in a further embodiment of the invention of the optimal separated detection of two different signal codes of bit length N each with the corresponding two reception filters according to FIG. 1a.

The two sequences A and D do not only represent a set of orthogonal sequences, but their cross-correlation functions are also exactly zero without secondary maxima. This is also true for the two inverse sequences A', D' with the specific feature that the directly negative sequence delivers a negative main maximum at the filter output, that this can, however, be suppressed as a misdetection by a positive threshold value setting under the premise of a differential coding for obtaining the mathematical sign after the envelope curve detector. The mathematical sign after the envelope curve detector is maintained if only the transient from 0 to L and vice versa is coded in the transmitter in a differential coding (differential coherent PSK, abbreviated DPSK). A decoding is necessary in the receiver, which evaluates this change. This opens up the application as a code multiplex method (CDMA) for the respective four different sequences of a length N.

The number of the different orthogonal complementary sequences with additional perfect cancelling cross correlation—meaning perfectly uncorrelated sequences—can be enlarged for a code multiplex method by going to sequences with complex values in DPSK within the base band by using quadrature components (I channel and Q channel), wherein the perfect properties are maintained.

The four different 8-bit sequences are, for example, multiplied by $e^{j\pi/2}$, $e^{j2\pi/2}$, $e^{j3\pi/2}$, respectively, or expressed differently, linear phases are added. In this way, one can already obtain 8 different sequences:

| | | | | | | | | |
|---|---|---|---|---|---|---|---|---|
| $A_1 = A$ | +1 | +1 | +1 | −1 | −1 | −1 | +1 | −1 |
| $A_2$ | $+e^{j\pi/2}$ | $+e^{j\pi/2}$ | $+e^{j\pi/2}$ | $-e^{j\pi/2}$ | $-e^{j\pi/2}$ | $-e^{j\pi/2}$ | $+e^{j\pi/2}$ | $-e^{j\pi/2}$ |
| $A_3 = A * e^{j2\pi/2} = A'$ | −1 | −1 | −1 | +1 | +1 | +1 | −1 | +1 |
| $A_4 = A_2 * e^{j3\pi/2}$ | $+e^{j3\pi/2}$ | $+e^{j3\pi/2}$ | $+e^{j3\pi/2}$ | $-e^{j3\pi/2}$ | $-e^{j3\pi/2}$ | $-e^{j3\pi/2}$ | $+e^{j3\pi/2}$ | $-e^{j3\pi/2}$ |
| $D_1 = D$ | +1 | +1 | +1 | −1 | +1 | +1 | −1 | +1 |
| $D_2$ | $+e^{j\pi/2}$ | $+e^{j\pi/2}$ | $+e^{j\pi/2}$ | $-e^{j\pi/2}$ | $+e^{j\pi/2}$ | $+e^{j\pi/2}$ | $-e^{j\pi/2}$ | $+e^{j\pi/2}$ |
| $D_3 = D * e^{j2\pi/2} = D'$ | −1 | −1 | −1 | +1 | −1 | −1 | +1 | −1 |
| $D_4 = D_2 * e^{j3\pi/2}$ | $-e^{j3\pi/2}$ | $-e^{j3\pi/2}$ | $-e^{j3\pi/2}$ | $+e^{j3\pi/2}$ | $-e^{j3\pi/2}$ | $-e^{j3\pi/2}$ | $+e^{j3\pi/2}$ | $-e^{j3\pi/2}$ |

Instead of the decision maker in the reception filter in the case of binary sequences, which suppresses a negative main maximum, each main maximum with a phase different from zero is suppressed in the multi-phase case, and only that filter of the filter bank, at which a main maximum without shifted phase shows up, allows the main maximum to pass as detected signal. As a result even more different orthogonal sequences can be generated in the complex signal space, e.g. by a respective further division of the phase angles, e.g. one can already attain with $e^{j\pi/4}$ steps a CDMA system for 16 subscribers, with $e^{j\pi/8}$ phase difference a system for 32 subscribers or with 64 PSK systems for 128 subscribers are possible, which are transmitted in a "bundled" manner with the same carrier frequency and are again "debundled" when received at the signal subscriber by means of perfect correlation reception of the sequences totally uncorrelated therewith.

The mentioned modulator/demodulator circuits can easily be realized by means of present digital signal processors (DSP).

The invention claimed is:

1. Circuit arrangement for forming a pulse-shaped signal in a reception filter for a received signal code $X_i$ of code values +1 or −1 in a carrier frequency transmission signal,
    wherein the received signal code has a form of a first signal code +1, +1, +1, −1, −1, −1, +1, −1,
    or a code derived from the first signal code by a symmetry law $X_i = \pm X_{N-1-i}^* e^{j\pi i}$, with i running through the integer numbers from 0 to (N/2)−1, wherein N is the total number of sub-pulses in the received signal code $X_i$,
    or a code derived from the first signal code by taking the reverse order,
    or a code derived from the first signal code by weighting the code values with alternating mathematical sign,
    or a code generated by putting the first or derived signal codes in series,
    wherein each signal code satisfies the symmetry condition $X_i = \pm X_{N-1-i}^* e^{j\pi i}$,
the circuit arrangement comprising:
    an optimal filter for sub-pulses with an A/D converter and a first shift register and a first downstream autocorrelation filter;
    a multiplier circuit connected at a point after the A/D converter to multiply the received signal code with an alternating mathematical sign in order to form a complementary code of the received signal code;
    a second shift register connected to the output of the multiplier circuit;
    a second downstream autocorrelation filter connected to the output of the second shift register; and
    an adder connected to the output of the first downstream autocorrelation filter and the second autocorrelation filter.

2. Circuit arrangement according to claim 1, wherein the circuit arrangement is adapted in such a way that the complementary code of the received signal code is formed by weighting with alternating mathematical sign in such a way that, by summation of the autocorrelation functions of the received signal code and the complementary code a main maximum builds up at the output of the reception filter with maximum height, whereas the secondary maxima cancel themselves by the same summation as a consequence of opposite phasing or mathematical sign.

3. Correlation filter comprising the circuit arrangement of claim 1, and further comprising different branches for different received signal codes derived by the symmetry law according to claim 1, wherein the circuit arrangement is connected in parallel as the reception filter for each of the different received signal codes, so that the cross-correlation functions of different received signal codes cancel at the filter output, and that the cross-correlation filter only lets the respective received code pass, which is set in the filter branch.

4. Transmission system for a signal code $X_i$ with code values +1 or −1 in a carrier frequency transmission signal,
    wherein the received signal code has a form of a first signal code +1, +1, +1, −1, −1, −1, +1, −1,
    or a code derived from the first signal code by a symmetry law $X_i = \pm X_{N-1-i}^* e^{j\pi i}$, with i running through the integer numbers from 0 to (N/2)−1, wherein N is the total number of sub-pulses in the received signal code $X_i$,
    or a code derived from the first signal code by taking the reverse order, or a code derived from the first signal code by weighting the code values with alternating mathematical sign, or a code generated by putting the first or derived signal codes in series, wherein each signal code satisfies the symmetry condition $X_i=\pm X_{N-1-i}{}^* e^{j\pi i}$, and wherein the transmission system comprises the circuit arrangement of claim 1.

5. Transmission system according to claim 4, wherein the transmission system is adapted so that two codes are used for transmission, wherein no secondary maxima appear in the cross correlation of the two codes.

6. Transmission system according to claim 5, wherein the cross correlation of the two codes is zero.

7. Transmission system according to claim 6, wherein the transmission system is adapted for being used as a multi-subscriber system by using sequences with complex values.

8. Transmission system according to claim 5, wherein the transmission system is adapted for being used as a multi-subscriber system by using sequences with complex values.

9. Transmission system according to claim 4, wherein the transmission system is adapted for being used as a multi-subscriber system by using sequences with complex values.

10. Circuit arrangement for forming a pulse-shaped signal in a reception filter for a received signal code $X_i$ of code values +1 or −1 in a carrier frequency transmission signal, wherein the received signal code has a form of a first signal code +1, +1, or a code derived from the first signal code by a symmetry law $X_i=\pm X_{N-1-i}{}^* e^{j\pi i}$, wherein N denotes the total number of sub-pulses in the received signal code $X_i$ and i runs through the integer numbers from 0 to (N/2)−1, or a code derived from the first signal code by taking the reverse order, or a code derived from the first signal code by weighting the code values with alternating mathematical sign, or a code generated by putting the first or derived signal codes in series, or a code generated by adding a quadrature component to the first signal code, wherein each signal code satisfies the symmetry condition $X_i=\pm X_{N-1-i}{}^* e^{j\pi i}$, the circuit arrangement comprising:

an optimal filter for sub-pulses with an A/D converter and a first shift register and a first downstream autocorrelation filter;

a multiplier circuit connected at a point after the A/D converter to multiply the received signal code with an alternating mathematical sign in order to form a complementary code of the received signal code;

a second shift register connected to the output of the multiplier circuit;

a second downstream autocorrelation filter connected to the output of the second shift register; and an adder connected to the output of the first downstream autocorrelation filter and the second autocorrelation filter.

11. Transmission system for a signal code $X_i$ with code values +1 or −1 in a carrier frequency transmission signal, wherein the signal code has a form of a first signal code +1, +1, or a code derived from the first signal code by the symmetry law $X_i=\pm X_{N-1-i}{}^* e^{j\pi i}$, wherein N is the total number of sub-pulses in the signal code $X_i$ and i runs through the integer numbers from 0 to (N/2)−1, or a code derived from the first signal code by taking the reverse order, or a code derived from the first signal code by weighting the code values with alternating mathematical sign, or a code generated by putting the first or derived signal codes in series, or a code generated by adding a quadrature component to the first signal code, wherein each signal code satisfies the symmetry condition $X_i=\pm X_{N-1-i}{}^* e^{j\pi i}$, and wherein the transmission system comprises the circuit arrangement in accordance with claim 2.

12. Transmission system according to claim 11, wherein the transmission system is adapted so that two codes are used for transmission, wherein no secondary maxima appear in the cross correlation of the two codes.

13. Transmission system according to claim 12, wherein the cross correlation of the two codes is zero.

14. Circuit arrangement according to claim 2, wherein the circuit arrangement is adapted in such a way that the complementary code of the received signal code is formed by weighting with alternating mathematical sign in such a way that, by summation of the autocorrelation functions of the received signal code and the complementary code a main maximum builds up at the output of the reception filter with maximum height, whereas the secondary maxima cancel themselves by the same summation as a consequence of opposite phasing or mathematical sign.

15. Correlation filter comprising the circuit arrangement of claim 2, and further comprising different branches for different received signal codes derived by the symmetry law according to claim 2, wherein the circuit arrangement is connected in parallel as the reception filter for each of the different received signal codes, so that the cross-correlation functions of different received signal codes cancel at the filter output, and that the cross-correlation filter only lets the respective received code pass, which is set in the filter branch.

16. Method for forming a pulse-shaped signal with a reception filter for a received signal code $X_i$ of code values +1 or −1 in a carrier frequency transmission signal, the method being executed by a circuit arrangement and comprising the steps of:

receiving, in the circuit arrangement, a first signal code having a form of +1, +1 with a carrier frequency signal or a code derived from the first signal code by a symmetry law $X_i=\pm X_{N-1-i}{}^* e^{j\pi i}$, wherein N denotes the total number of sub-pulses in the received signal code $X_i$ and i runs through the integer numbers from 0 to (N/2)−1, or a code derived from the first signal code by taking the reverse order, or a code derived from the first signal code by weighting the code values with alternating mathematical sign, or a code generated by putting the first or derived signal codes in series, or a code generated by addition of a quadrature component to the first signal code, wherein each signal code satisfies the symmetry condition $Xi=\pm X_{N-1-i}{}^* e^{j\pi i}$;

branching off the received signal;

multiplying, with a multiplier circuit, the branched-off received signal with alternating mathematical sign for forming a complementary code;

forming a first autocorrelation of the received signal;

forming a second autocorrelation of the branched-off received signal, which has been multiplied with alternating mathematical sign; and adding the results of the first and second autocorrelations.

17. Method according to claim 16, wherein, by summation of the first autocorrelation and the second autocorrelation, which is formed in the reception filter, a main maximum results at the filter output with maximum height, whereas the secondary maxima cancel each other by the same summation as a consequence of opposite phasing or mathematical sign.

* * * * *

UNITED STATES PATENT AND TRADEMARK OFFICE
CERTIFICATE OF CORRECTION

PATENT NO. : 8,423,598 B2
APPLICATION NO. : 11/572615
DATED : April 16, 2013
INVENTOR(S) : Reinhart Rudershausen It is certified that error appears in the above-identified patent and that said Letters Patent is hereby corrected as shown below:

In the Claims:

Column 8, line 10, Claim 11, please delete "2." and insert therefor -- 10. --;

Column 8, line 17, Claim 14, please delete "2," and insert therefor -- 10, --;

Column 8, line 28, Claim 15, please delete "2," and insert therefor -- 10, --; and Column 8, line 30, Claim 15, please delete "2," and insert therefor -- 10, --.

Signed and Sealed this
Sixth Day of August, 2013

Teresa Stanek Rea
*Acting Director of the United States Patent and Trademark Office*